US006920271B2

(12) United States Patent
Chen et al.

(10) Patent No.: US 6,920,271 B2
(45) Date of Patent: Jul. 19, 2005

(54) REDUCED POLARIZATION MODE DISPERSION FIBER

(75) Inventors: Xin Chen, Corning, NY (US); Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 96 days.

(21) Appl. No.: 10/358,768

(22) Filed: Feb. 5, 2003

(65) Prior Publication Data

US 2003/0152348 A1 Aug. 14, 2003

Related U.S. Application Data

(60) Provisional application No. 60/356,454, filed on Feb. 11, 2002.

(51) Int. Cl.[7] .............................................. G02B 6/02
(52) U.S. Cl. ...................................... 385/123; 385/124
(58) Field of Search ................................ 385/123, 124, 385/1, 4

(56) References Cited

U.S. PATENT DOCUMENTS

| 5,943,466 A | * | 8/1999 | Henderson et al. | ......... 385/123 |
| 6,240,748 B1 | * | 6/2001 | Henderson et al. | ........... 65/402 |

FOREIGN PATENT DOCUMENTS

WO   WO 02/03115   1/2002   ............ G02B/6/16

OTHER PUBLICATIONS

Li et al. ('Fiber Spin–Profile designs for producing fibers with low polarization mode dispersion', Optics Letters, Nov. 1, 1998, vol. 23, No. 21, pp. 1659–1661).*

A. Galtarossa et al, "Optimized Spinning Design for Low PMD Fibers: An Analytical Approach", *Journal of Lightwave Technology*, vol. 19, No. 10, Oct. 2001, pp. 1502–1512.

A.J. Barlow, et al, "Birefringence and polarization mode–dispersion in spun single–mode fibers", *Applied Optics*, vol. 20, No. 17, Sep. 1981, pp. 2962–2968.

X. Chen et al. "Scaling properties of polarization mode dispersion of spun fibers in the presence of random mode coupling". Optics Letters, vol. 27, No. 18. Sep. 15, 2002, pp. 1595–1597.

J. G. Ellison et al, "A Fully Polarimetric Optical Time–Domain Reflectometer", IEEE Photonics Technology Letters. vol. 10, No. 2. Feb. 1998. pp. 246–248.

A. Galtarossa et al, "Measurements of beat length and perturbation length in long single–mode fibers", Optics Letters, vol. 25, No. 6, Mar. 15, 2000, pp. 384–386.

(Continued)

*Primary Examiner*—Kianni C Kaveh
(74) *Attorney, Agent, or Firm*—Robert L. Carlson

(57) ABSTRACT

Disclosed is an optical waveguide fiber having a reduced PMD and a method of making the optical waveguide fiber. The optical waveguide fiber in accord with the invention has a particular spin pattern impressed upon the optical waveguide fiber during the drawing step. The spin pattern causes the fast axis of birefringence to rotate along the long axis of the optical waveguide fiber. The spin functions in accord with the invention provide for reduced PMD even in cases in which draw speed, spin magnitude, or modulation parameter vary while the spin pattern is being impressed upon the optical waveguide fiber.

9 Claims, 8 Drawing Sheets

OTHER PUBLICATIONS

N. Gisin et al. "Polarization Mode Dispersion of Short and Long Single–Mode Fibers", Journal of Lightwave Technology, vol. 9, No. 7, Jul. 1991, pp. 821–827.

B. Huttner et al, "Distributed PMD Measurement with a Polarization–OTDR in Optical Fibers", Journal of Lightwave Technology, vol. 17, No. 10, Oct. 1999, pp. 1843–1848.

B. Huttner et al, "Local Birefringence Measurements in Single–Mode Fibers with Coherent Optical Frequency–Domain Reflectometry", IEEE Photonics Technology Letters, vol. 10, No. 10, Oct. 1998, pp. 1458–1460.

M. J. Li et al, "Fiber spin–profile designs for producing fibers with low polarization mode dispersion", Optics Letters, vol. 23, No. 21, Nov. 1, 1998, pp. 1659–1661.

H. Sunnerud et al. Measurement of Polarization Mode Dispersion Accumulation Along Installed Optical Fibers, IEEE Photonics Technology Letters, vol. 11, No. 7, Jul. 1999, pp. 860–862.

M. Wegmuller et al, "Distributed Beatlength Measurement in Single–Mode Fibers with Optical Frequency–Domain Reflectometry", Journal of Lightwave Technology, vol. 20, No. 5, May 2002, pp. 828–835.

* cited by examiner

REDUCED POLARIZATION MODE DISPERSION FIBER

This application claims the benefit of Provisional Application No. 60/356,454, filed Feb. 11, 2002.

BACKGROUND OF THE INVENTION

1. Field of the Invention

The present invention relates generally to optical waveguide fiber having reduced polarization mode dispersion (PMD), and particularly to optical waveguide fiber having reduced PMD due to an impressed pattern of change in fast axis of birefringence.

2. Technical Background

Polarization Mode Dispersion becomes a significant source of inter-symbol interference in high data rate systems, especially those systems designed for longer spacing between opto-electronic signal regenerators. As a result, optical waveguide fibers having reduced PMD have been developed, as typified in U.S. Pat. No. 5,943,466, Henderson et al. incorporated herein by reference in its entirety. In the Henderson patent is disclosed an optical waveguide fiber and a method of making the fiber in which the fast axis of birefringence (and thus the orthogonal slow axis of birefringence) changes in direction in accord with a pattern impressed on the fiber. The pattern can be impressed by spinning the fiber, in accord with a spin function, during the drawing process. As is described in the Henderson patent, the spin function instructs a spinning apparatus to effect a pre-selected pattern of relative rotation (relative spin) between the preform and the fiber being drawn therefrom. By relative rotation is meant either the fiber or the preform or both of these are spun to produce the desired change of birefringence axis. Spin functions set forth in the Henderson patent include frequency and amplitude modulated sinusoidal functions.

Because PMD is effected by fiber properties, such as beat length, as well as by external factors, such as cabling method and materials, work has continued to find spin functions which are sufficiently simple in form to allow ease of implementation in a manufacturing environment. At the same time, the spin functions must be robust in the sense that they produce the desired reduction in PMD under normally encountered manufacturing variations and under a variety of cabling and installation conditions.

Typical, cost effective, spinning apparatus will impress a spin pattern on the optical waveguide fiber that deviates somewhat from the pattern prescribed by the spin function. For example, the spinning apparatus may not be sufficiently responsive to follow the pattern defined by the spin function. There is a need, therefore, for identification of spin functions which in addition to reducing PMD for a wide range of beat lengths also maintain the PMD reduction under conditions of normally encountered manufacturing variations.

The present invention addresses the problem of designing a family of spin functions that produce a selected reduction in PMD despite relatively large deviations of actual impressed spin pattern from target spin pattern, the deviations being due to limitations inherent in the spinning apparatus or to variations in draw speed.

SUMMARY OF THE INVENTION

One aspect of the invention is an optical waveguide fiber having reduced PMD. The PMD is reduced by causing the fast (or slow) axis of birefringence to vary along the length of the fiber in accord with a spin function, $\alpha(z) = \alpha_0 [f_1(\gamma_0 z + \gamma_1 f_2(\gamma_2 z)) \times \{f_3(\gamma_3, \gamma_4 z)\}]$, where z is distance along the long axis of the optical waveguide fiber, $\alpha_0$ is spin magnitude in spins per unit length, $f_1$, $f_2$, and $f_3$ are periodic functions, and $\gamma_0$, $\gamma_1$, $\gamma_2$, $\gamma_3$, and $\gamma_4$ are modulation parameters. The spin function $\alpha(z)$ preferably has units of spins per unit length so that the respective units on the modulation parameters are $\gamma_0$ (1/unit length), $\gamma_1$ (dimensionless), $\gamma_2$ (1/unit length), $\gamma_3$ (dimensionless), and $\gamma_4$ (1/unit length). To achieve a desired PMD reduction factor of less than or equal to 0.50 the spin function can be used to impress the pattern of varying birefringence upon the entire fiber length or upon a portion of the fiber length. The PMD reduction factor is the ratio of PMD in a fiber exhibiting an impressed spin pattern, due to a spin function in accord with the invention, to a similar fiber not exhibiting an impressed spin pattern. The spin functions in accord with the invention are effective to reduce PMD in fibers having beat lengths greater than or equal to 0.5 meter. That is, the spin functions of the present invention have sufficient harmonic content to reduce PMD in fibers having a wide range of beat lengths and are particularly effective for fibers having beat lengths of about 0.5 meters to 50 meters or greater.

An advantageous feature of the spin function in accord with the invention is that the spin magnitude, $\alpha_0$, can vary in the range up to about 35% of a target value while providing the desired PMD reduction factor. It will be understood that the variation in spin magnitude, and thus in spin function, can be due to inherent deficiencies in the apparatus causing the relative spin between preform and fiber drawn therefrom or to variations in draw speed. Thus, the spin functions in accord with the invention improve upon those disclosed in the Henderson patent.

In a preferred embodiment of this aspect of the invention, the PMD reduction factor is less than or equal to 0.2 for fiber beat lengths greater than or equal to 1.2 meters In a further embodiment of this aspect of the invention, the periodic functions, $f_1$, $f_2$, and $f_3$ are selected from the group of trigonometric functions, sine and cosine. Spin functions in accord with this embodiment can provide a PMD reduction factor less than or equal to 0.1 for beat lengths greater than 1 meter.

In another embodiment, the spin magnitude, $\alpha_0$, is less than or equal to 6 turns/meter, a value low enough to facilitate manufacture even at higher draw speeds. The spin magnitude is preferably less than 5 turns/meter and more preferably less than 4 turns/meter. In particular, in the embodiment wherein the spin function has the form $\alpha(z) = \alpha_0 \cos[\pi z + \pi \epsilon_1 \sin(\pi z)] \times [1 + 2\pi \epsilon_1 \cos(\pi z)]$, the spin magnitude, $\alpha_0$, is preferable in the range from 1 turn/meter to 4 turns/meter and the modulation parameter, $\epsilon_1$, is in the range from 0.15 to 0.35. In general, effective spin functions in accord with this aspect of the invention can exhibit a value of the parameter $\epsilon_1$ that varies from about 5% to 7.5% of target value without adversely effecting the PMD reduction factor.

In yet another embodiment of the invention the spin function has a spatial period, that is, a length that defines the length of the repeating unit of the periodic function. The spin function of this embodiment is characterized in that the repeating unit has at least two local maxima of unequal magnitude.

A second aspect of the invention is a method of making an optical waveguide fiber having reduced PMD. The method includes the steps: a) drawing the optical waveguide fiber from a preform; and, b) during at least a portion of the drawing step, causing relative rotation between the optical waveguide fiber and the preform in accord with a spin function $\alpha(z)$, where, $\alpha(z)=\alpha_0[f_1(\gamma_0 z+\gamma_1 f_2(\gamma_2 z))\times\{f_3(\gamma_3,\gamma_4 z)\}]$, equation (1), and where z is distance along the long axis of the optical waveguide fiber, $\alpha_0$ is the spin magnitude, $f_1$, $f_2$, and $f_3$ are periodic functions, and $\gamma_0$, $\gamma_1$, $\gamma_2$, $\gamma_3$, and $\gamma_4$ are modulation parameters. The method in accord with this aspect of the invention provides an optical waveguide fiber having the structure, including an impressed spin pattern, and properties disclosed and described herein.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
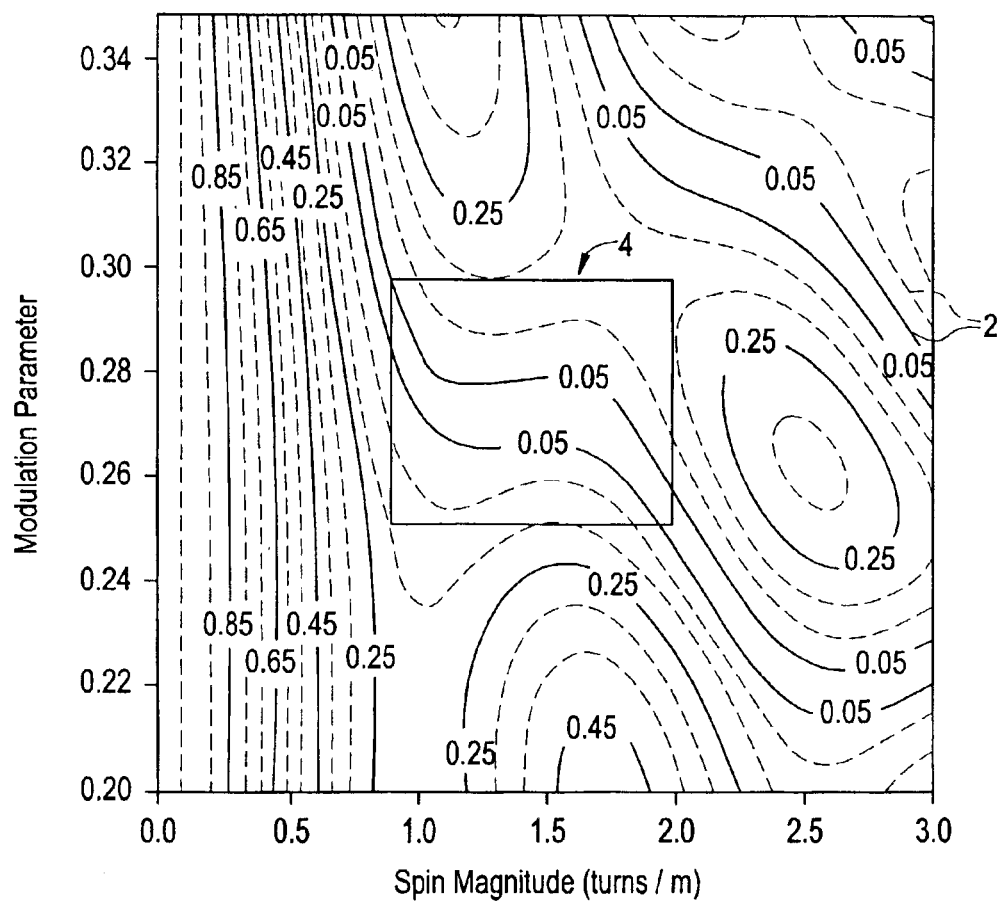
FIG. 1 is a contour chart showing PMD performance of a fiber exhibiting a spin function in accord with the invention.

Reference will now be made in detail to the present preferred embodiments of the invention, examples of which are illustrated in the accompanying drawings. Whenever possible, the same reference numerals will be used throughout the drawings to refer to the same or like features. One exemplary embodiment of the optical waveguide fiber having a spin pattern in accord with the present invention exhibits the PMD performance shown in FIG. 1. Contours 2 in FIG. 1 are values of PMD reduction factor corresponding to particular values of modulation parameter, $\epsilon_1$, the vertical axis of the chart, and spin magnitude, $\alpha_0$, the horizontal axis of the chart, of a fiber having an impressed spin in accord with a spin function $\alpha(z)=\alpha_0 \cos[\pi z+\pi\epsilon_1 \sin(\pi z)]\times[1+2\pi\epsilon_1 \cos(\pi z)]$, equation (2). In this embodiment, referring to the general expression for the spin function, equation (1), $f_1$ is cosine, $f_2$ is sine, $f_3$ is $[1+2\pi\epsilon_1 \cos(\pi z)]$, $\gamma_0=\pi$, $\gamma_1=\pi\epsilon_1$, $\gamma_2=\pi$, $\gamma_3=2\pi\epsilon_1$, and $\gamma_4=\pi$. The optical waveguide fiber modeled in FIG. 1 has a minimum beat length greater than or equal to about 1.2 meters.

Box 4 in FIG. 1 demarcates the limits of $\alpha_0$ and $\epsilon_1$, for which the PMD reduction factor of the fiber is not greater than about 0.18. That is, over a range of spin magnitudes from about 0.9 turns/meter to 2 turns/meter and a range of modulation parameters, $\epsilon_1$, from about 0.25 to 0.30, the PMD reduction factor of the optical waveguide fiber exhibiting the impressed spin in accord with the spin function, equation (2) is less than or equal to about 0.18. This range of values of spin magnitude is advantageously low, thereby facilitating manufacture. That is, manufacture is facilitated because the spin function and the actual spin impressed on the fiber are in closer agreement at lower spin magnitudes using spinning apparatus know in the art and described for example in the Henderson patent.

The contours of FIG. 1 are labeled with the PMD reduction factor to which they pertain. The spacing between contours is 0.067. For an extended area of box 4 the PMD reduction factor is in the range of 0.05, and for most of box 4 the PMD reduction factor is less than or equal to 0.12. FIG. 1 illustrates that equation (2) is effective to maintain PMD reduction factor below 0.5 for spin magnitude greater than about 0.55 turns/meter and modulation parameter $\epsilon_1$ values greater than about 0.20.

Figure 2:
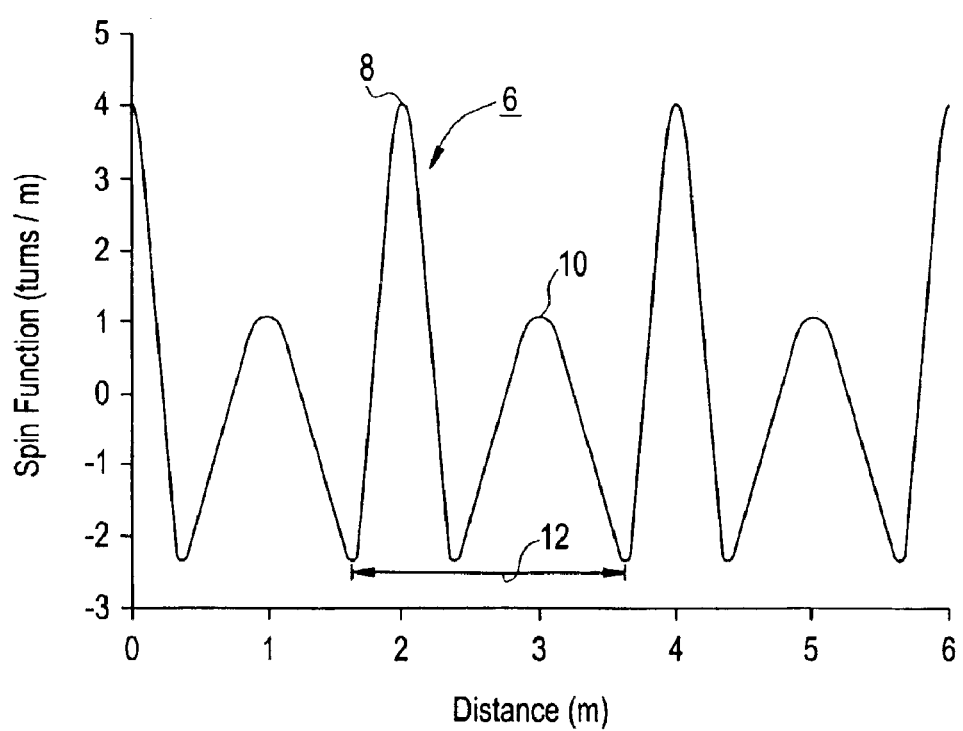
FIG. 2 is a chart showing the spatial dependence of the spin function used in the fiber of FIG. 1.

A chart of $\alpha(z)$, the spin function expressed in turns/meter, versus z, the distance along the long axis of the optical waveguide fiber, for equation (2) is set forth as curve 6 of FIG. 2. A clockwise spin direction is defined as a positive value of spin rate, a negative value being assigned to counter-clockwise spin direction. Curve 6 corresponds to $\alpha_0=1.5$ turns/meter and $\epsilon_1=0.27$. The chart shows the spin function is a repeating, that is, a periodic, function having a period 12 of 2 meters. Within each period the spin function exhibits a first and a second local maximum value 8 and 10, respectively, of different respective spin magnitude. The change in spin function amplitude and slope within each period of the spin function shown in curve 6 provides for mixing of the two orthogonal polarization modes of a light signal propagating in the fiber. The mixing is effective for a wide range of fiber beat lengths as is discussed below.

The particular curve shape exemplified by curve 6 is effective to mix the polarization modes even under manufacturing conditions in which the values of spin magnitude, $\alpha_0$, and modulation parameter $\epsilon_1$ vary from target values. Variations in $\alpha_0$ would produce variations in the values 8 and 10 of the local maxima within a period while variations in $\epsilon_1$, would generally produce a change in overall shape of the curve.

Figure 3:
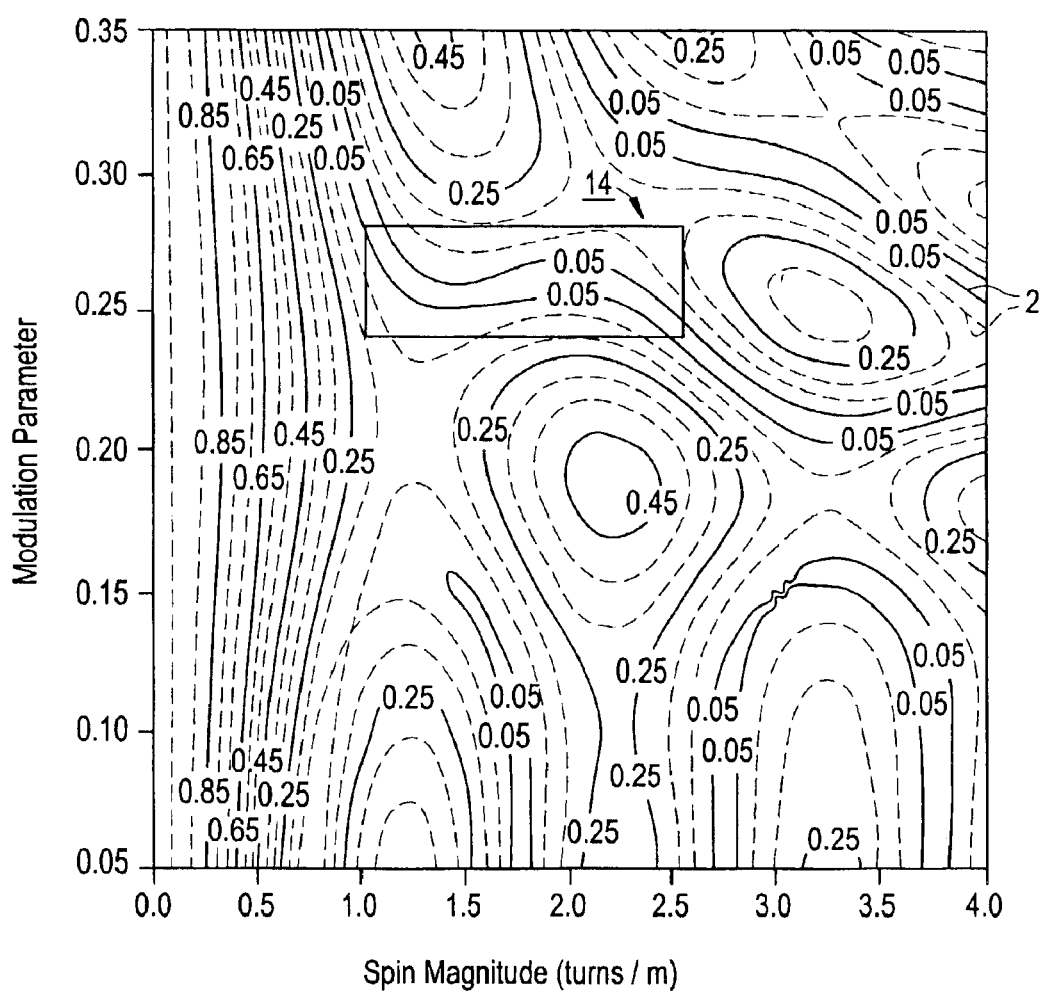
FIG. 3 is a contour chart showing PMD performance of a fiber exhibiting a spin function in accord with the invention.
Figure 4:
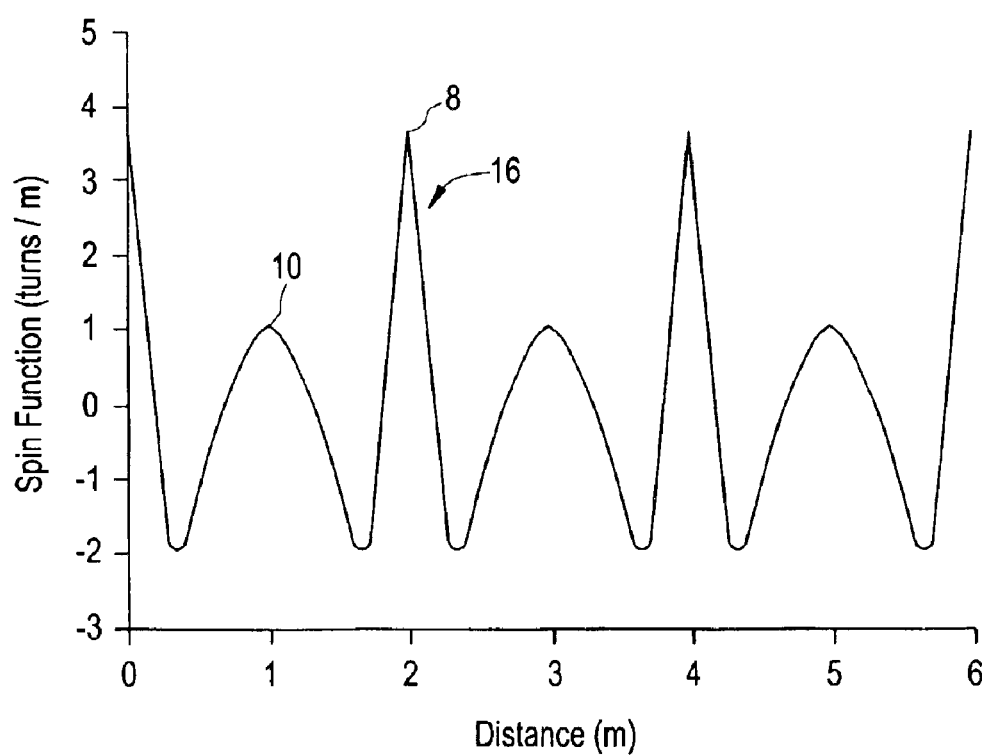
FIG. 4 is a chart showing the spatial dependence of the spin function used in the fiber of FIG. 3.

The effect of changing the shape of curve 6 of FIG. 2 can be shown by considering curve 16 of FIG. 4, where $f_1$ has been changed from the cosine function of equation (2) to a triangular function. The modulation parameters have been adjusted to produce curve 16. In particular, the equation corresponding to curve 16 is: $\alpha(z)=\alpha_0 \text{Tri}[0.5z+0.5\epsilon_2 \sin(2\pi z)]\times[1+2\pi\epsilon_2 \cos(2\pi z)]$, where the function Tri is a triangular function defined as $[\text{Tri}(z)=1-(4z/T)::\{0<z<T/2\}$; $\text{Tri}(z)=(4z/T)-3::\{T/2\leq z<T\}]$, where T is the period of the spin function. Curve 16 was generated using $\alpha_0=1.5$ turns/meter and $\epsilon_2=0.27$. Thus, curve 16 is similar to curve 6 in that the respective periods of the curves are equal as are the first and second maximum values 8 and 10. The introduction of the triangular function sharpens the peaks of the first and second local maxima 8 and 10 within a period. The contour chart corresponding to the spin function associated with curve 16 is shown in FIG. 3. Box 14 in FIG. 3 demarcates an area of the contour chart for which PMD reduction factor is less than or equal to 0.18. The value of $\alpha_0$, the spin magnitude, can vary from about 1 turn/meter to 2.55 turns/ meter and, $\epsilon_2$, the modulation parameter, can vary from about 0.24 to 0.28 while maintaining the 0.18 PMD reduction factor. A comparison of FIGS. 1 and 3 shows that the parameter ranges, in particular the range of $\alpha_0$ and $\epsilon_1$ or $\epsilon_2$ to produce a desired low PMD reduction factor are essentially the same for the triangular spin function and the spin function of equation 2.

Figure 5:
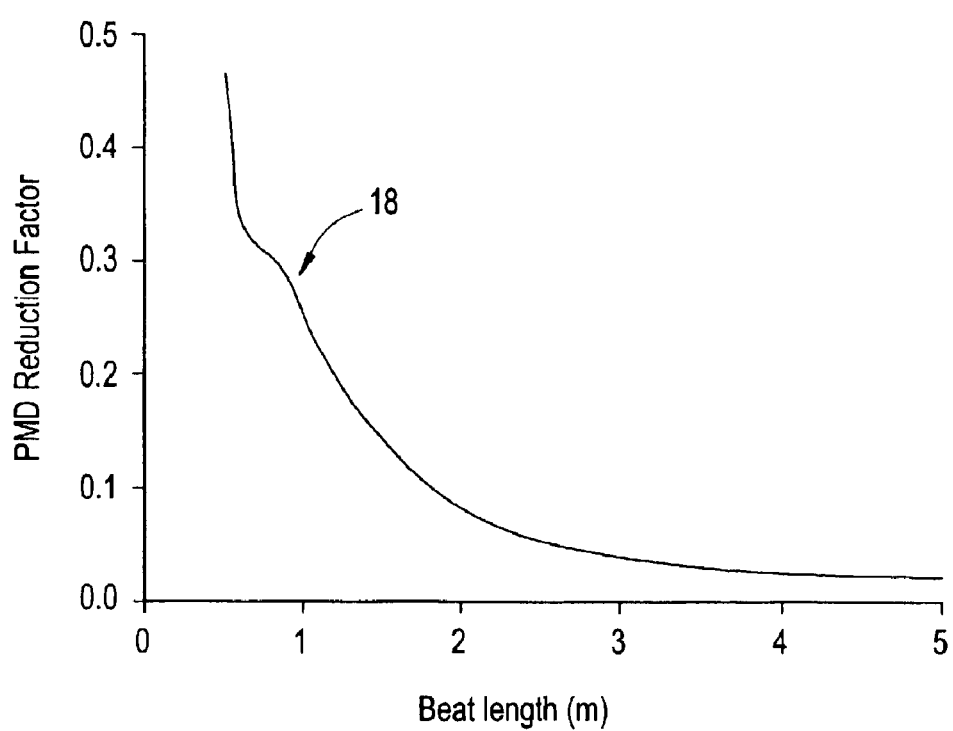
FIG. 5 is a chart showing PMD reduction factor as a function of beat length in a fiber exhibiting a spin function having the spatial period shown in FIG. 3.

The effectiveness of the spin function of equation (2), and variations thereof, as typified by changing $f_1$ from a cosine function to a triangular function, to provide desired PMD reduction factors for a wide range of beat lengths is shown as curve 18 of FIG. 5. Curve 18 shows that PMD reduction factor remains below 0.5, a factor of two reduction in comparison to a fiber having no impressed spin pattern, for beats lengths as low as 0.5 meters. PMD reduction factor is less than or equal to 0.2 for beat lengths greater than or equal to about 1.2 meters. For fibers having beat lengths of greater than about 2 meters, the PMD reduction factor is less than 0.1. The PMD reduction factor is substantially independent of beat length for fiber having beat lengths greater than about 4 meters.

The features of the spin functions in accord with equation (2), which is a particular embodiment of the general spin equation (1), illustrated by box 4 of FIG. 1, box 14 of FIG. 3, and curve 18 of FIG. 5, provide a desired PMD reduction factor for an exceptionally wide range of beat lengths, while relaxing the requirements on the manufacturing apparatus that impresses the spin function upon the fiber. Use of this set of spin functions solves the problem of controlling polarization mode dispersion in light of inherent errors of spinning apparatus, variability of draw speed, and difference between the spin function and the spin actually impressed upon the optical waveguide fiber.

Figure 6:
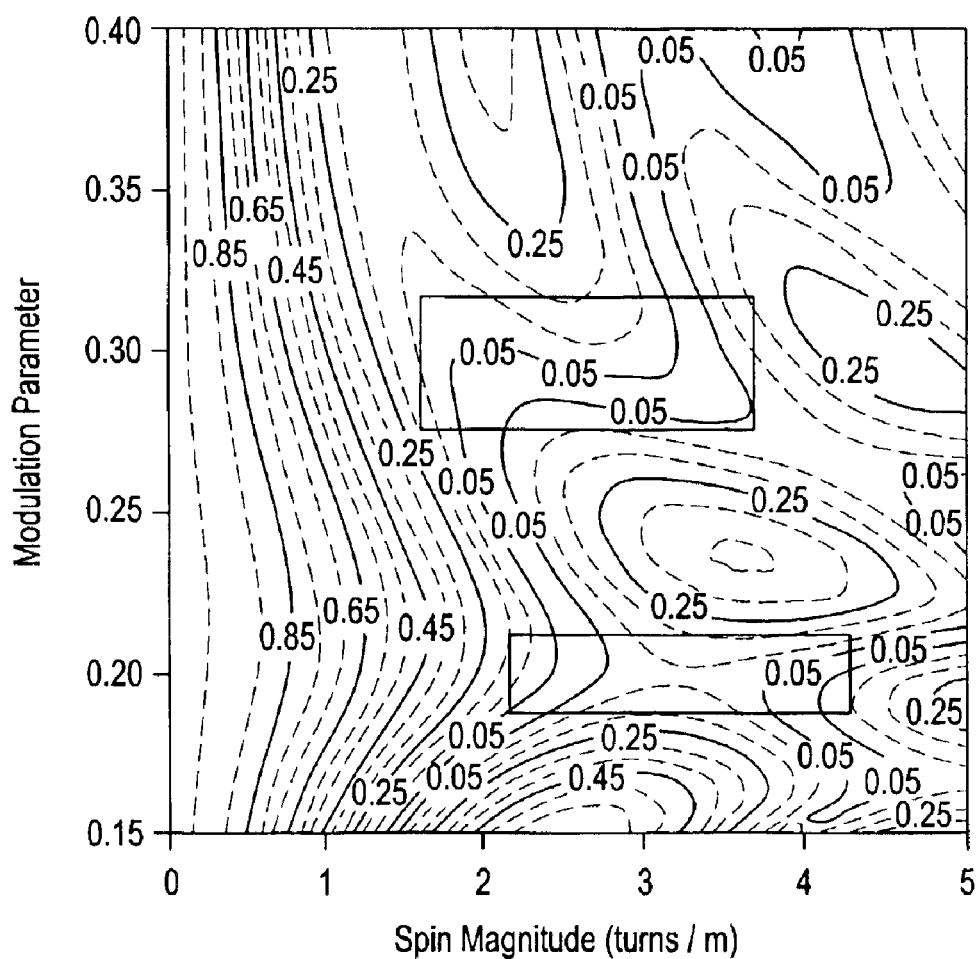
FIG. 6 is a contour chart showing PMD performance of a fiber exhibiting a spin function in accord with the invention.

Species of the frequency modulated spin functions disclosed in the Henderson patent have also been found to exhibit the capability to maintain a desired PMD reduction factor while spin magnitude, $\alpha_0$, and modulation parameter, $\gamma_1$, vary. These spin functions are expressed as:

$\alpha(z)=\alpha_0 f_1[\gamma_0 z+2\pi\epsilon_3 f_2(\gamma_2 z)]$, (equation 3), where the definitions of the symbols correspond to those of equation 1 and $2\pi\epsilon_3=\gamma_1$. Choosing $f_1$ and $f_2$ to be sine (or cosine) functions, $\gamma_0=\pi$, $\gamma_2=2\pi$, the spin function is:

$\alpha(z)=\alpha_0 \sin[\pi z+2\pi\epsilon_3 \sin(2\pi z)]$, (equation 4). FIG. 6 is a contour chart showing PMD reduction factor contours on a plot of modulation parameter $\gamma_1$ versus spin magnitude $\alpha_0$. Box 20 in FIG. 6 demarcates an area of the chart over which the PMD reduction factor is less than or equal to 0.18 for $\epsilon_3$ in the range from 0.28 to 0.32 and $\alpha_0$ in the range from 1.5 turns/meter to 3.7 turns/meter. Box 22 in FIG. 6 demarcates an area of the chart over which the PMD reduction factor is less than or equal to 0.18 for $\epsilon_3$ in the range from 0.19 to 0.21 and $\alpha_0$ in the range from 2.1 turns/meter to 4.3 turns/meter. The stability of the PMD reduction factor for the spin functions in accord with equation 4 compare favorably with that of the spin functions in accord with equation 2.

Figure 7:
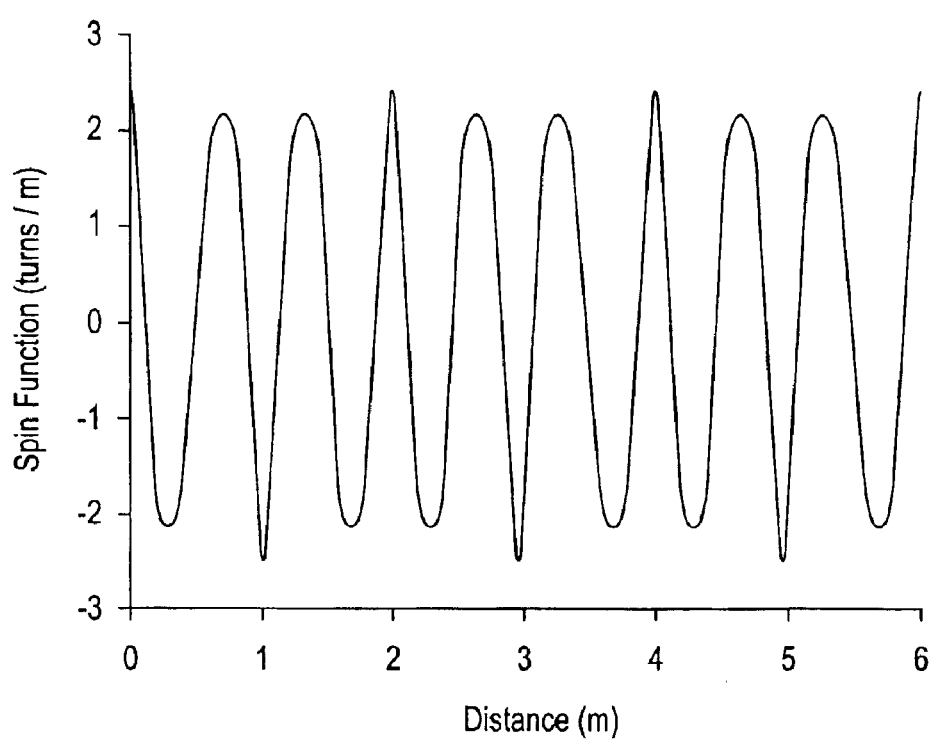
FIGS. 7 and 8 are charts showing the spatial dependence of respective spin functions in accord with the invention.
Figure 8:
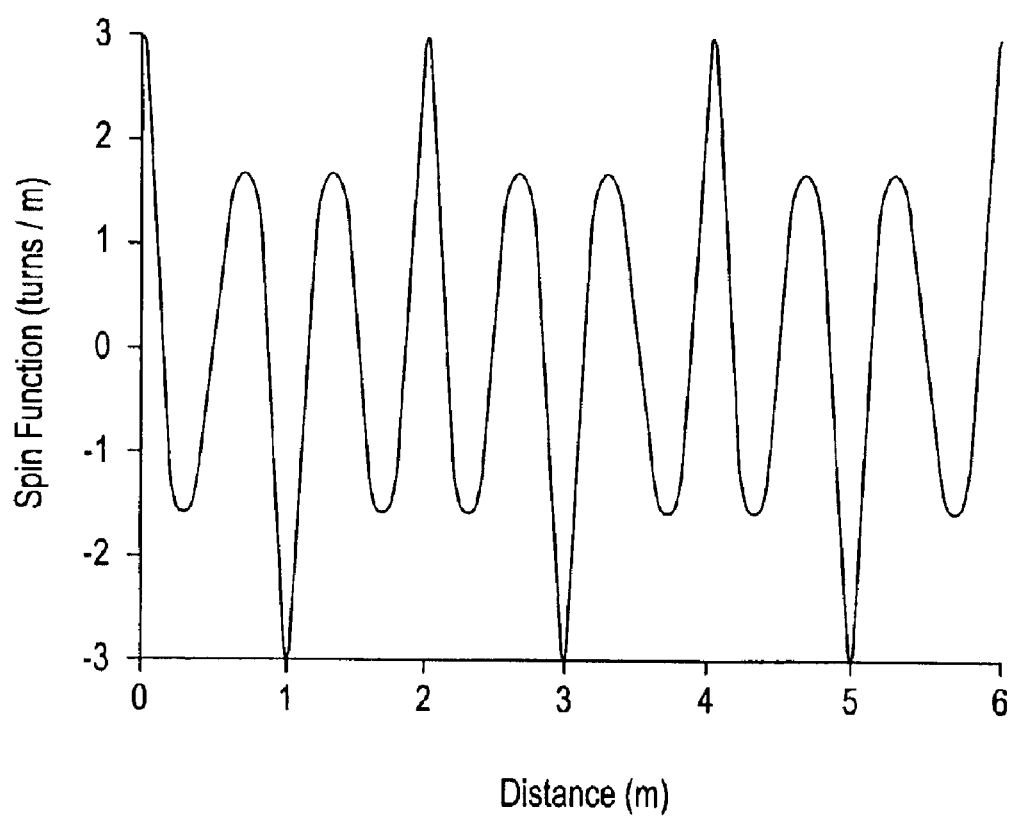

FIG. 7 is a chart of the spin function of equation 4 versus distance along the long axis of the fiber. Curve 24 of the chart is drawn for the case $\alpha_0=2.5$ turns/meter and $\epsilon_3=0.28$. The spatial period 12 is about 2 meters and the spin function has three local maxima, 8, 10, and 10 and a minimum value 26 in each spatial period. The shape of the spin function in accord with equation 4 is more complex than that corresponding to equation 2, but is still within the capability of spin apparatus known in the art, such as that described in the Henderson patent. FIG. 8 is a variation of the spin function depicted in FIG. 7. Curve 28 in FIG. 8 is drawn for the case $\alpha_0=3.0$ turns/meter and $\epsilon_3=0.20$. The main features of curve 28 are analogous to those of curve 24 of FIG. 7. FIG. 8 serves to illustrate one of the many effective spin functions in accord with equation 4 that yields the PMD reduction factor performance as set forth in FIG. 6.

The spin functions depicted in FIGS. 2, 4, 7, and 8 are examples of the family of spin functions defined by equation 1. The desired PMD reduction factor is achieved while maintaining the spin magnitude, $\alpha_0$, low and the spin function simple enough to be compatible with typical spin apparatus. At the same time, the spin functions disclosed and described herein allow for deviations from target of the draw speed, the spin magnitude, and the modulation parameters while maintaining PMD reduction factor within desired bounds.

Causing relative rotation between the preform and the fiber drawn from the preform in accord with a spin function in accord with the invention produces a corresponding spin pattern in the optical waveguide fiber. The mechanism that holds the preform in the draw furnace and also moves the preform into the furnace during drawing can be rotatably mounted above the furnace. The preform holding mechanism can then be rotated in accord with the spin function. As an alternative, the preform holding mechanism can be structured so that only vertical movement is allowed. In this configuration, one or more surfaces are brought into contact with the optical waveguide fiber and the one or more surfaces are caused to move in a plane substantially perpendicular to the direction of fiber drawing. The movement of the one or more surfaces is controlled to rotate the fiber relative to the preform. Both the preform and the optical waveguide fiber may be simultaneously or successively rotated to arrive at the desired spin pattern in the optical waveguide fiber.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical waveguide fiber having reduced polarization mode dispersion comprising:

a core region bounded by a clad layer, said optical waveguide fiber having a birefringence having a fast axis that varies in direction from point to point along at least a portion of the length of said optical waveguide fiber, the variation in direction of the fast axis being in accord with a pre-selected pattern formed in the optical waveguide fiber by a spin function, $\alpha(z)$, wherein the spin function $\alpha(z)$, the spin magnitude, and the modulation parameters are selected to provide, for a fiber having a beat length greater than or equal to about 0.5 meters, a polarization mode dispersion reduction factor which remains less than or equal to 0.50 when the spin magnitude varies up to about 35% of a target spin magnitude value, and where the spin function $\alpha(z)$ is of the form: $\alpha(z)=\alpha_0[f_1(\gamma_0 z+\gamma_1 f_2(\gamma_2 z))\times\{f_3(\gamma_3,\gamma_4 z)\}]$, where z is distance along the long axis of the optical waveguide fiber, $\alpha_0$ is spin magnitude, $f_1$, $f_2$, and $f_3$ are periodic functions, and $\gamma_0$, $\gamma_1$, $\gamma_2$, $\gamma_3$, $\gamma_4$ are modulation parameters.

2. The optical waveguide fiber of claim 1 wherein for beat lengths greater than or equal to 1.2 meters the polarization mode dispersion reduction factor is less than or equal to 0.2.

3. The optical waveguide fiber of claim 1 wherein $f_1$, $f_2$, or $f_3$ are trigonometric functions.

4. The optical waveguide fiber of claim 3 wherein the spin magnitude is less than or equal to about 6 turns/meter.

5. The optical waveguide fiber of claim 3 wherein $f_1$, $f_2$, and $f_3$ are selected from the group consisting of sine and cosine and polarization mode dispersion reduction factor is no greater than 0.1 for beat lengths greater than 1 meter.

6. The optical waveguide fiber of claim 2 wherein the spin function has the form $\alpha(z)=\alpha_0 \cos[\pi z+\pi\epsilon_1 \sin(\pi z)]\times[1+2\pi\epsilon_1 \cos(\pi z)]$, and $\alpha_0$ is in the range from 1 turn/meter to 4 turns/meter and $\epsilon_1$ is in the range 0.15 to 0.35.

7. The optical waveguide fiber of claim 2 wherein $\gamma_1$ can vary from about 5% to 7.5% of a target value.

8. The optical waveguide fiber of claim 1 wherein the spin function has a spatial period, the amplitude of the spin function within each spatial period having at least two local maxima of unequal magnitude.

9. The optical waveguide fiber of claim 1 wherein the spin function has the form $\alpha(z)=\alpha_0 \text{Tri}[0.5z+0.5\epsilon_2 \sin(2\pi z)]\times[1+2\pi\epsilon_2 \cos(2\pi z)]$, where Tri is a triangular function defined as $[\text{Tri}(z)=1-(4z/T)::\{0<z<T/2\}; \text{Tri}(z)=(4z/T)-3::\{T/2\leq z<T\}]$, where T is the period of the spin function.

* * * * *

UNITED STATES PATENT AND TRADEMARK OFFICE
CERTIFICATE OF CORRECTION

PATENT NO. : 6,920,271 B2
DATED : July 19, 2005
INVENTOR(S) : Xin Chen et al.

It is certified that error appears in the above-identified patent and that said Letters Patent is hereby corrected as shown below:

Column 7,
Line 7, "6. The optical waveguide fiber of claim 2 wherein the spin" should be
-- 6. The optical waveguide fiber of claim 1 wherein the spin --.
Line 11, "7. The optical waveguide fiber of claim 2 wherein $\gamma_1$ can" should be
-- 7. The optical waveguide fiber of claim 1 wherein $\gamma_1$ can --.

Signed and Sealed this

Sixth Day of September, 2005

JON W. DUDAS
*Director of the United States Patent and Trademark Office*